Aug. 4, 1964 E. O. P. TATTER ETAL 3,143,352

PORTABLE SOUND TRANSLATING DEVICE

Filed July 7, 1961

INVENTORS.
Ernest O. P. Tatter
Peter W. Tappan
By Hofgren, Brady,
Wegner, Allen & Stellman
Attys.

United States Patent Office 3,143,352

Patented Aug. 4, 1964

3,143,352

PORTABLE SOUND TRANSLATING DEVICE

Ernest O. P. Tatter, Addison, and Peter W. Tappan, Bartlett, Ill., assignors to Warwick Manufacturing Corporation, a corporation of Delaware Filed July 7, 1961, Ser. No. 122,557
10 Claims. (Cl. 274—9)

This invention relates to the construction of portable sound translating devices, such as record players and tape recorders, and more particularly to a construction enabling such a device to operate substantially free of translational and rotational forces while being carried or moved about.

Present day sound translating devices, such as a record player, are designed for operation in a generally static and horizontal position. Portable models of such devices are common, but none are suitable for playing while being carried about. In operating such a device while being carried, the swinging and jerking forces of the carrier's hand, as well as other translational or rotational forces during movement, must be obviated so that the proper relationship between the movable components of the device may be maintained and the device operated as if it were in a static position. These problems are particularly acute with regard to a portable or mobile record player; the record player has a tone arm which must be free to pivot so that the stylus carried by the cartridge may be able to track along the spiral grooves of a phonograph record without disturbance. Furthermore, rotating parts, such as a turntable or magnetic tape reels for a tape recorder, must be protected against changes in velocity due to inertial forces created by movement of the unit.

It is, therefore, the primary object of this invention to provide a new and improved construction for portable or mobile sound translating devices.

It is another object of this invention to provide a portable sound translating device having the mass of its components balanced about a primary pivot.

A further object is to provide a portable or mobile sound translating device having components mounted on a motor-board having pivotal movement in a single plane, the motor-board having independent pivotal mounting means for components about axes spaced from the pivotal motor-board mounting; the mass of each pivotal component and the mass of the motor-board and components being balanced about their respective axes to have their centers of gravity lying on their respective axes to substantially float the device free from disturbing forces while being carried or moved about.

Still another object of this invention is to provide a hand carrying means pivotally connected to the casing for the sound translating device in a manner to lessen transmission of forces to the casing.

A more specific object of this invention is to provide a portable record player having components mounted on a motor-board supported on the record player casing and adapted for pivotal movement therein, the turntable and tone arm being mounted upon separate pivotal mountings on the motor-board for movement parallel to the plane of movement of said motor-board, the tone arm carrying a cartridge at its outer end pivotally mounted for movement in a plane generally perpendicular to the plane of movement of the turntable, the mass of each pivotal component and the entire unit being balanced about their respective axes to have their center of mass lie on their respective axes to float the record player while being carried or moved about and thereby render the device capable of being operated free of disturbing forces while being transported.

Further objects and advantages will become apparent from the following detailed description taken in connection with the accompanying drawings in which.

Figure 1:
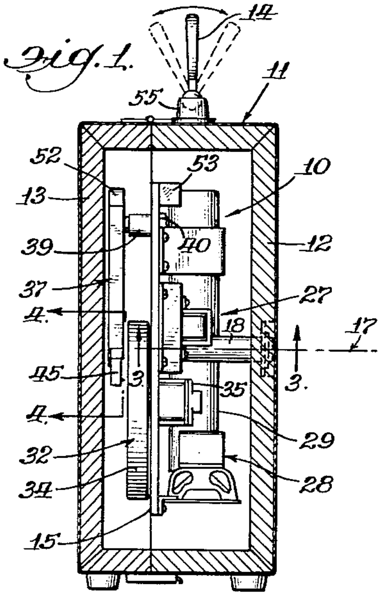
FIG. 1 is an end elevational view of a portable record player having the end wall of its enclosure removed and with alternate positions of the pivotal handle represented in broken lines.

While this invention is susceptible of embodiment in many different forms, there is shown in the drawings and will be described in detail an embodiment of the invention with the understanding that the present disclosure is to be considered as an exemplification of the principles of the invention and is not intended to limit the invention to the embodiment illustrated. The scope of the invention will be pointed out in the appended claims.

Figure 2:
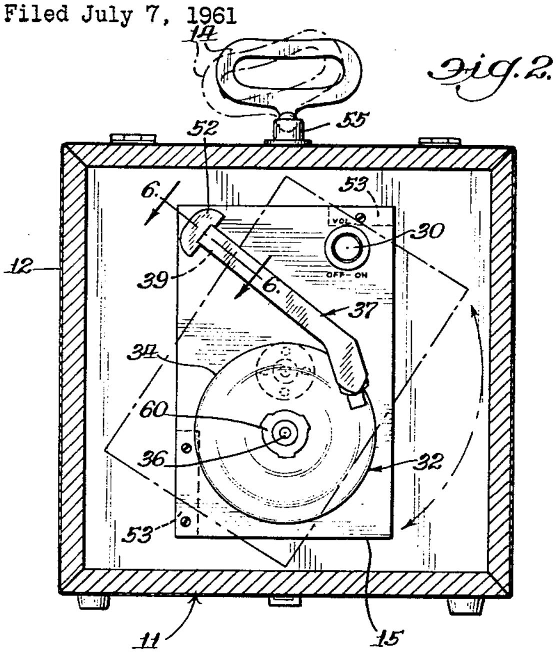
FIG. 2 is a side elevational view of the record player having the hinged cover-wall of the casing removed and a different position of the pivotal motor-board and pivotal handle are shown in broken line.

Turning now to the drawings and more particularly to FIGS. 1 and 2, there is shown a preferred embodiment of the present invention comprising a portable record player 10 mounted within a carrying case 11 having a base section 12 and a cover section 13 hinged together. The upper portion of the case has a pivotal handle 14, the function and construction of which will be described more fully hereinafter.

The present invention enables the device to play with proper fidelity while being carried or moved about and to play in any position including upside down, right side up, and on its side. Several problems have had to be overcome in adapting a record player or other sound translating devices for such use. Particularly if carried by hand, the normal swinging and jerking movements of the carrier's arm while walking impart translational and rotational forces to the phonograph which disturb the normal relationship between movable parts.

Reference will be made to forces including acceleration forces acting in different directions relative to the device with the depth direction of the device being from left to right of the device and the height direction being from top to bottom as viewed in FIG. 1 with the width direction from left to right as viewed in FIG. 2. These forces are derived from movements imparted to the device and gravity.

As shown in FIGS. 1 and 2, the components of the record player are fastened to a motor-board 15 which in turn is pivotally mounted on a wall of base section 12 of case 11; the components are generally arranged to provide little lateral bulk to either side of the motor-board and thereby permit the case 11 to be constructed with similarly little lateral bulk. For purposes of defining direction relative to the carrier's body, the term "lateral" shall be used herein and in the claims in reference to the direction extending outward from the carrier's body and through the smallest width of the case when held in proper carrying position adjacent to the body.

The motor-board is adapted to move or pivot within the plane of the board, having its pivot axis 17 perpendicular to the swinging arc that is to be encountered when the case is carried by the handle and held adjacent to the body.

Figure 3:
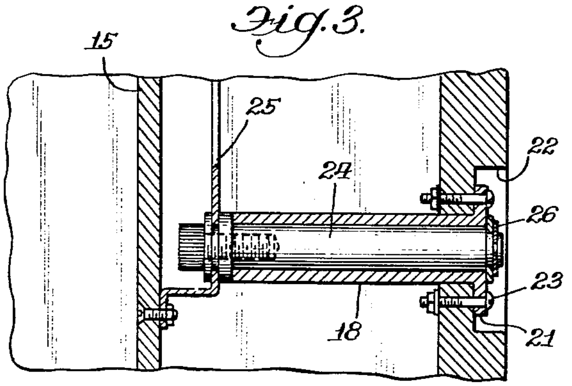
FIG. 3 is an enlarged fragmentary sectional view of the device taken along line 3—3 of FIG. 1 and illustrating the motor-board mounting.

As shown in FIG. 3, the motor-board mounting comprises a hollow cylindrical bearing 18 extending laterally across the interior of the base section of the case 11 and intermediate the upper and lower walls thereof; the cylindrical bearing 18 has an annular flange 21 at one end secured by suitable fasteners 23 to the base section 12 and within recess 22. A shaft 24 has one end secured to a bracket 25 carried by the motor-board and has its remaining portion extending into bearing 18 for pivotal movement therein. The shaft 24 is restricted against longitudinal movement relative to the bearing by bearing means 26.

The record player components mounted on the motor-board generally comprise amplification and speaker means indicated generally at 27 and 28 secured thereto by suitable brackets; a power source 29 consisting of batteries in a housing connected in series and secured to the motor-board by suitable brackets and having a switch 30 for control of same; pivotal carrier means 32 for a record consisting of a turntable 34 driven by motor 35 from a separate battery power source in a plane parallel to the motor-board and about spindle 36; and sound translating means 37.

To isolate the device from unwanted forces created while being carried about, the entire unit as well as each pivotal component is restricted to movement in a single plane about its own pivot axis. The mass of the unit and the mass of each pivotal component is balanced about its respective axis. A proper relationship of the planes of movement of the unit and pivotal components affords maximum isolation from disturbances. The mass of a record and turntable are inherently balanced about their axis of rotation as a result of conventional record player construction to have the center of gravity of the turntable lie on its axis of rotation which prevents speed variations due to gravity or to width or height acceleration forces. This balancing should also apply to the turntable drive motor shaft and idler wheel shaft.

Figure 4:
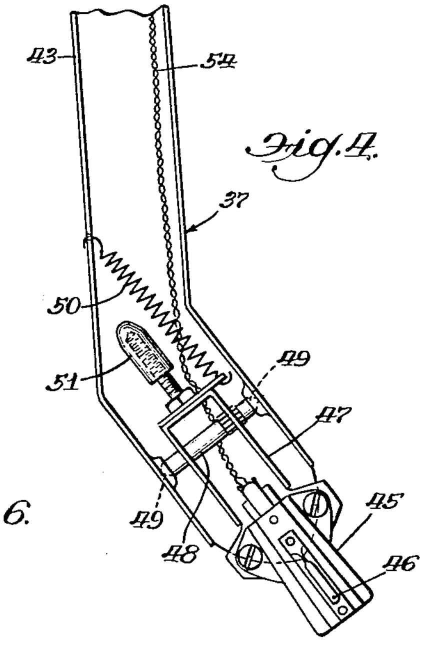
FIG. 4 is an enlarged fragmentary view of the tone arm taken along line 4—4 of FIG. 1.
Figure 6:
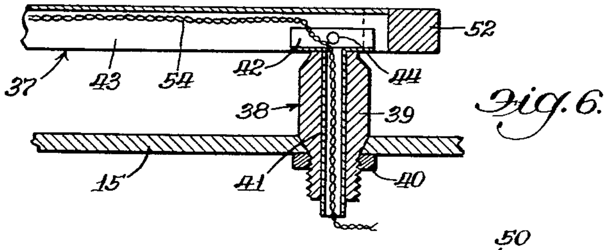
FIG. 6 is an enlarged fragmentary sectional view of the tone arm and its mounting taken along line 6—6 of FIG. 2.
Figure 5:
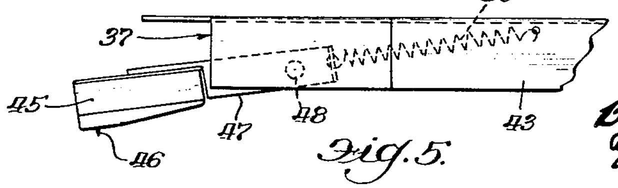
FIG. 5 is a side elevational view of the portion of the tone arm shown in FIG. 4.

As shown generally in FIGS. 1 and 2 and in more detail in FIGS. 4–6, the sound translating means comprises a tone arm 37 pivotally supported on the motor-board by a mounting 38 and adapted for free movement in a plane parallel to the motor-board and turntable. The tone arm mounting 38 has a sleeve 39 extending through an opening in the motor-board and is held in place by lock nut 40. A tube 41, containing pickup wire 42, pivots within the sleeve 39 and the wire 42 has extensions 54 at its upper end. Dependent flanges 43 of the tone arm are attached to the mounting 38 by a pin 44 extending through a pair of extensions 42 of the tube 41. The flanges 43 and the tube extensions 42 are held tightly together by the pin so that the tone arm is restricted against movement in any plane other than parallel to the motor-board.

A cartridge 45 carrying a stylus 46 is pivotally mounted on the outermost end of the tone arm by a mounting bracket 47 on pin 48 extending between the tone arm flanges 43; the pin 48 has pointed ends socketed in seats 49 on the tone arm flanges. The cartridge is arranged to pivot in a plane perpendicular to the plane of the turntable and the motor-board. The mass of the cartridge 45 and bracket 47 is balanced about its pivot axis by a weight 51 extending outwardly from the bracket 47. This balancing places the center of gravity of the cartridge assembly on the pivotal axis thereof to prevent the stylus from movement due to gravity or depth acceleration. A coiled tension spring 50 is connected between a flange 43 of the tone arm and the cartridge bracket 47 so as to pivotally urge the stylus toward the record and provide a tracking force.

The mass of the tone arm 37 and attached members is balanced about its axis of rotation parallel to the turntable and motor-board by a weight 52 to have the tone arm center of gravity lie on its pivot axis which prevents the stylus from sliding across the record under the influence of gravity or height or width acceleration. The mass of the entire record player and motor-board is balanced about and free to pivot about the lateral pivotal axis 17 by weight 53 secured to portions of the motor-board. Although the balancing is shown as being accomplished by weights, this may also be done by specific design and location of the components to inherently obtain balance of mass. This prevents rotational acceleration about the axis 17 from being imparted to the record player which would otherwise disturb the turntable speed and cause the tone arm to swing and also prevents height and width acceleration from causing rotational accelleration about the axis 17.

Mild rotation of the case about axes extending in the directions of the height and width of the unit may be imparted without affecting the proper operation, but a resilient support or shock mounting of the case may be desirable in some applications. Severe rotational forces of these kinds may be prevented by pivoting the unit about both axes with the center of gravity preferably lying on both axes. In a hand-carried instrument, satisfactory results can usually be obtained by the above referred to handle 14 which is attached to the upper portion of the carrying case by a universal joint 55. The joint permits the unit to maintain substantially the same orientation in spite of the swinging and turning movements of the user's arm.

The portable record player is thereby provided with a construction which substantially floats the components free of disturbing forces during transit so that the stylus may properly track upon the record player disc and the turntable may maintain constant velocity throughout operation. The record player will play in any position. In order to hold a record on the turntable against the action of gravity and depth acceleration, a suitable member 60 of springy material is mounted on the turntable to engage in the hole of a record and resiliently retain the record on the turntable.

We claim:

1. A portable or mobile device, comprising: a supporting means; a mounting base supported on said supporting means and adapted for pivotal movement; components secured to said mounting base and comprising thereamong a member pivotally mounted on said mounting base for rotation about an axis parallel to the axis of pivoting of the mounting base, the mass of each of said pivotal member and base being balanced about their respective axes, to prevent rotation of the pivotal member with respect to the base when the supporting means is subjected to rotational or translational forces.

2. A portable device as defined in claim 1 in which a manual carrying means is pivotally attached to said supporting means.

3. A portable or mobile sound translating device, comprising: a support; a motor-board supported by said support and mounted for pivotal movement in the plane of the motor-board; sound translating equipment having components secured to said motor-board comprising a portable electrical power source, sound translating means, and amplification and speaker means, said motor-board being balanced about the pivotal mounting thereof substantially to float the sound translating equipment and thereby enable the device to operate substantially free of disturbing forces while being transported.

4. A portable record player, comprising in combination: a member adapted to be carried by hand; a motor-board pivotally mounted on a side of said member for movement in one generally upright plane; and record player components mounted on said motor-board comprising a tone arm pivotally mounted on said motor-board for movement in a plane parallel to the plane of movement of the motor-board, and having the mass thereof balanced about the tone arm pivot, said motor-board having its mass balanced about the pivotal mounting of said motor-board.

5. A portable or mobile record player, comprising in combination: a support; a motor-board mounted on said support for pivotal movement in one plane, and record player components mounted on said motor-board comprising power means, amplifier, speaker and sound translating means, some of said components being pivotally mounted and balanced about their mounting axis; the mass of said record player components being balanced about the motor-board pivot mounting to enable the record player to operate free of translational and rotational forces while being transported.

6. A record player, comprising in combination: a motor-board mounted for pivotal movement in the plane thereof; record player components mounted on said motor-board comprising a tone arm and cartridge mount adjacent an end of the arm, said cartridge mount being pivotally mounted on the tone arm for movement about an axis parallel to the plane of the motor-board, said cartridge mount having means counterbalancing its mass about its pivot axis, said tone arm being pivotally mounted adjacent an end thereof on said motor-board for pivotal movement in a plane parallel to the motor-board; means counterbalancing the mass of the tone arm and the cartridge about the pivot axis of said tone arm; and means balancing the mass of said record player components and motor-board about the motor-board pivot mounting to substantially isolate said record player components from translational and rotational forces to permit operation while being transported.

7. A record player as defined in claim 6 in which a spring is associated with the cartridge mount to provide a record tracking force.

8. A record player, comprising in combination: a support; a motor-board mounted on the support for pivotal movement in a plane generally vertical and perpendicular to the lateral extent of said support; record player components mounted on said motor-board comprising a tone arm pivotally mounted on said motor-board for movement in a plane generally parallel to the plane of said motor-board with the tone arm mass balanced about the tone arm pivotal axis; and means balancing the mass of said record player components and motor-board about the motor-board mounting.

9. A portable record player comprising in combination: a carrying case having relatively little lateral bulk adapted to be carried alongside a person's body; a motor-board mounted within said casing on at least one side wall thereof for pivotal movement in a plane generally vertical and perpendicular to the lateral extent of said casing; record player components carried by said motor-board comprising a tone arm, a cartridge carrying a stylus, and a turntable, said turntable mounted for rotation in a plane generally parallel to the plane of said motor-board, said cartridge having a mounting bracket pivotally mounted on said tone arm for movement about an axis parallel to the plane of said turntable; means balancing the mass of said cartridge and bracket about its pivotal axis on the tone arm; a tension spring having one end secured to the tone arm and an opposite end secured to said cartridge mounting bracket at a point offset from the pivotal axis of said bracket for pivotally urging the cartridge and bracket about its axis and thereby providing the stylus with a tracking force; said tone arm being pivotally mounted on said motor-board for movement in a plane generally parallel to said turntable with the mass thereof balanced about the pivotal mounting of said tone arm; and means balancing the mass of said record player components and motor-board about the motor-board pivotal mounting.

10. A portable record player as in claim 9, in which the case is provided with a handle connected thereto by a universal joint.

References Cited in the file of this patent

UNITED STATES PATENTS

| | | |
|---|---|---|
| 1,202,698 | Ford | Oct. 24, 1916 |
| 1,464,943 | Klemme | Aug. 14, 1923 |
| 1,671,991 | Lindner | June 5, 1928 |
| 1,962,479 | Carlile | June 12, 1934 |
| 2,044,073 | Hurley | June 16, 1936 |